(12) United States Patent
Shu et al.

(10) Patent No.: US 12,434,561 B2
(45) Date of Patent: Oct. 7, 2025

(54) ASSISTANCE SYSTEM, PORTABLE WIRELESS TERMINAL, CONTROL METHOD FOR ASSISTANCE SYSTEM, CONTROL METHOD FOR PORTABLE WIRELESS TERMINAL, AND PROGRAM

(71) Applicant: Robert Bosch GmbH, Stuttgart (DE)

(72) Inventors: Absalom Shu, Kanagawa (JP); S N Prashanth, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/762,156

(22) PCT Filed: Sep. 17, 2020

(86) PCT No.: PCT/IB2020/058668
§ 371 (c)(1),
(2) Date: Mar. 21, 2022

(87) PCT Pub. No.: WO2021/053573
PCT Pub. Date: Mar. 25, 2021

(65) Prior Publication Data
US 2022/0371441 A1    Nov. 24, 2022

(30) Foreign Application Priority Data
Sep. 19, 2019   (JP) ................................ 2019-170851

(51) Int. Cl.
*B60K 37/06*     (2006.01)
*B60K 35/10*     (2024.01)
(Continued)

(52) U.S. Cl.
CPC .............. *B60K 35/10* (2024.01); *B60K 35/80* (2024.01); *B60K 35/85* (2024.01);
(Continued)

(58) Field of Classification Search
CPC ....................................................... B62J 45/00
See application file for complete search history.

(56) References Cited

U.S. PATENT DOCUMENTS

| | | |
|---|---|---|
| 2014/0280580 A1 | 9/2014 | Langlois et al. |
| 2015/0285657 A1* | 10/2015 | Sarvestani .............. G01S 19/19 |
| | | 702/19 |

(Continued)

FOREIGN PATENT DOCUMENTS

| | | |
|---|---|---|
| CN | 108136979 A | 6/2018 |
| DE | 102016102031 A1 | 8/2017 |

(Continued)

OTHER PUBLICATIONS

International Search Report and Written Opinion for Application No. PCT/IB2020/058668 dated Dec. 15, 2020 (10 pages).

*Primary Examiner* — Nan-Ying Yang
(74) *Attorney, Agent, or Firm* — Michael Best & Friedrich LLP

(57) ABSTRACT

The present invention obtains an assistance system capable of assisting with function setting of a straddle-type vehicle by a rider, a portable wireless terminal used for such an assistance system, a control method for such an assistance system, a control method for such a portable wireless terminal, and a program run on such a portable wireless terminal.

In an assistance system (1), an acquisition section (51) of a portable wireless terminal (50) wirelessly acquires information on the function setting operated on an input device (11) of a straddle-type vehicle (10), and an input section (52) of the portable wireless terminal (50) provides a guidance corresponding to the information on the function setting (Continued)

operated on the input device (11) of the straddle-type vehicle (10) when accepting the operation of the function setting by the rider.

13 Claims, 2 Drawing Sheets

(51) Int. Cl.
    *B60K 35/80*           (2024.01)
    *B60K 35/85*           (2024.01)

(52) U.S. Cl.
    CPC   *B60K 2360/1438* (2024.01); *B60K 2360/566* (2024.01); *B60K 2360/573* (2024.01); *B60K 2360/589* (2024.01)

(56) References Cited

U.S. PATENT DOCUMENTS

| | | | |
|---|---|---|---|
| 2016/0221627 A1* | 8/2016 | Hines | B62K 23/02 |
| 2017/0327184 A1* | 11/2017 | Contello | B62M 9/06 |
| 2018/0127058 A1* | 5/2018 | Rodgers | B62M 9/122 |
| 2019/0149645 A1* | 5/2019 | Montez | B62J 43/30 455/556.1 |

FOREIGN PATENT DOCUMENTS

| | | |
|---|---|---|
| DE | 102018126410 A1 | 4/2020 |
| GB | 2517593 A | 2/2015 |
| JP | 2018150029 A | 9/2018 |

\* cited by examiner

[FIG. 1]
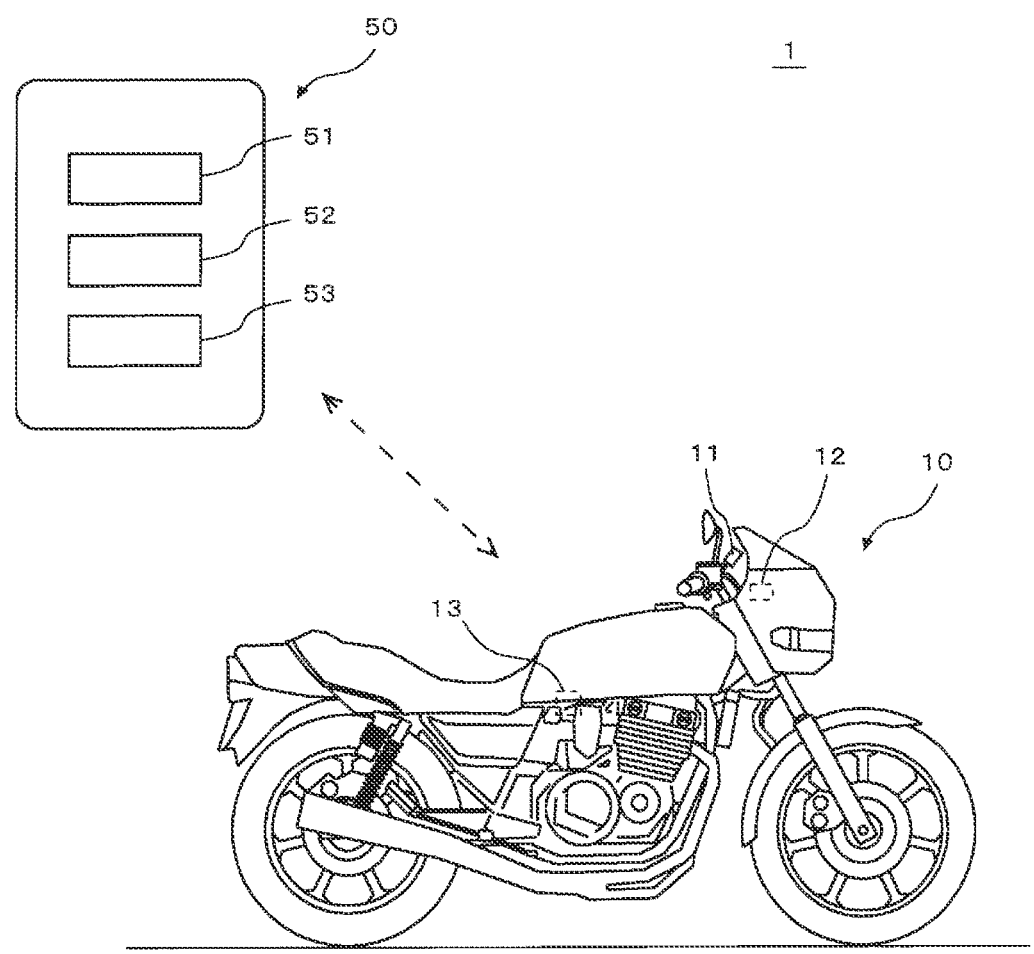

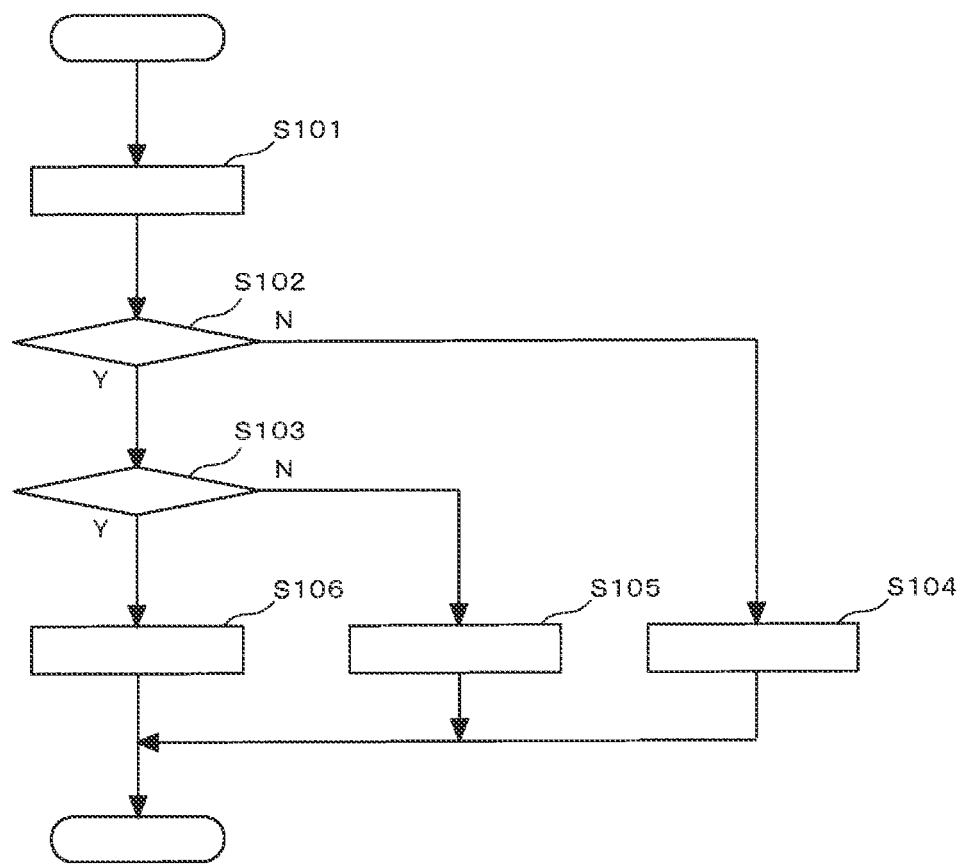
[FIG. 2]

ASSISTANCE SYSTEM, PORTABLE WIRELESS TERMINAL, CONTROL METHOD FOR ASSISTANCE SYSTEM, CONTROL METHOD FOR PORTABLE WIRELESS TERMINAL, AND PROGRAM

BACKGROUND OF THE INVENTION

The present invention relates to an assistance system for function setting of a straddle-type vehicle by a rider, a portable wireless terminal used for the assistance system, a control method for the assistance system, a control method for the portable wireless terminal, and a program run on the portable wireless terminal.

As a conventional assistance system, such a system has been available that a rider sets a function of a straddle-type vehicle by using a portable wireless terminal, information on the function setting is received by a communication device that is provided to the straddle-type vehicle and directly or indirectly communicates with the portable wireless terminal, and a controller provided to the straddle-type vehicle causes the straddle-type vehicle to perform operation to which the information is reflected (for example, see JP-A-2018-150029).

SUMMARY OF THE INVENTION

The rider sets various functions while using the straddle-type vehicle. In the conventional assistance system, the information on the function setting is not transmitted to the portable wireless terminal. Thus, the rider has to memorize a content of the function setting, which has been made while the rider uses the straddle-type vehicle, and to enter the information in the portable wireless terminal after using the straddle-type vehicle. Also when stopping the straddle-type vehicle, the rider desires not to operate the portable wireless terminal in order to keep a stop posture of the straddle-type vehicle. As a result, it may be required for the rider to keep memorizing the content of the function setting, which has been made while the rider uses the straddle-type vehicle, over a long period until the rider stops using the straddle-type vehicle.

The present invention has been made in view of the above-described problem as the background, and therefore obtains an assistance system capable of assisting with function setting of a straddle-type vehicle by a rider, a portable wireless terminal used for such an assistance system, a control method for such an assistance system, a control method for such a portable wireless terminal, and a program run on such a portable wireless terminal.

An assistance system according to the present invention is an assistance system for function setting of a straddle-type vehicle by a rider and includes: an input device that is provided to the straddle-type vehicle and accepts an operation of the function setting of the straddle-type vehicle by the rider; a communication device provided to the straddle-type vehicle; a portable wireless terminal that includes an input section accepting the operation of the function setting of the straddle-type vehicle by the rider and an output section wirelessly outputting information on the function setting accepted by the input section and that directly or indirectly communicates with the communication device of the straddle-type vehicle; and a controller that is provided to the straddle-type vehicle and causes the straddle-type vehicle to perform operation, to which the information on the function setting output from the output section of the portable wireless terminal is reflected. The portable wireless terminal further includes an acquisition section that wirelessly acquires the information on the function setting operated on the input device of the straddle-type vehicle. When accepting the operation of the function setting by the rider, the input section of the portable wireless terminal changes a guidance for the operation provided to the rider on the basis of the information on the function setting acquired by the acquisition section of the portable wireless terminal.

A portable wireless terminal according to the present invention is a portable wireless terminal directly or indirectly communicating with a communication device of a straddle-type vehicle that includes: an input device that accepts an operation of function setting of the straddle-type vehicle by a rider; and a controller that controls operation of the straddle-type vehicle. The portable wireless terminal includes: an input section that accepts the operation of the function setting of the straddle-type vehicle by the rider; and an output section that wirelessly outputs information on the function setting accepted by the input section so that the controller causes the straddle-type vehicle to be operated on the basis of the information on the function setting. The portable wireless terminal further includes an acquisition section that wirelessly acquires the information on the function setting operated on the input device of the straddle-type vehicle. When accepting the operation of the function setting by the rider, the input section changes a guidance for the operation provided to the rider on the basis of the information on the function setting acquired by the acquisition section.

A control method for an assistance system according to the present invention is a control method for an assistance system for function setting of a straddle-type vehicle by a rider, and includes: accepting the rider's operation of the function setting of the straddle-type vehicle by an input device provided to the straddle-type vehicle; directly or indirectly communicating with a communication device provided to the straddle-type vehicle by a portable wireless terminal including an input section that accepts the operation of the function setting of the straddle-type vehicle by the rider and an output section that wirelessly outputs information on the function setting accepted by the input section; causing the straddle-type vehicle to perform operation, to which the information on the function setting output from the output section of the portable wireless terminal is reflected, by a controller that is provided to the straddle-type vehicle; further wirelessly acquiring the information on the function setting operated on the input device of the straddle-type vehicle by an acquisition section of the portable wireless terminal; and, when accepting the operation of the function setting by the rider, changing a guidance for the operation provided to the rider by the input section of the portable wireless terminal on the basis of the information on the function setting acquired by the acquisition section of the portable wireless terminal.

A control method for a portable wireless terminal according to the present invention is a control method for a portable wireless terminal that directly or indirectly communicates with a communication device of a straddle-type vehicle including: an input device that accepts an operation of function setting of the straddle-type vehicle by a rider; and a controller that controls operation of the straddle-type vehicle. The control method for the portable wireless terminal includes: accepting the rider's operation of the function setting of the straddle-type vehicle by an input section of the portable wireless terminal; wirelessly outputting information on the function setting accepted by the input section of the portable wireless terminal by an output section of the portable wireless terminal so that the controller causes the straddle-type vehicle to be operated on the basis of the information on the function setting; further wirelessly acquiring the information on the function setting operated on the input device of the straddle-type vehicle by an acquisition section of the portable wireless terminal; and when accepting the operation of the function setting by the rider, changing a guidance for the operation provided to the rider by the input section of the portable wireless terminal on the basis of the information on the function setting acquired by the acquisition section of the portable wireless terminal.

A program according to the present invention is a program run on a portable wireless terminal that directly or indirectly communicates with a communication device of a straddle-type vehicle including: an input device that accepts an operation of function setting of the straddle-type vehicle by a rider; and a controller that controls operation of the straddle-type vehicle. The program executes: a step of accepting the rider's operation of the function setting of the straddle-type vehicle by an input section of the portable wireless terminal; and a step of wirelessly outputting information on the function setting accepted by the input section of the portable wireless terminal by an output section of the portable wireless terminal so that the controller causes the straddle-type vehicle to be operated on the basis of the information on the function setting. The program further executes a step of wirelessly acquiring the information on the function setting operated on the input device of the straddle-type vehicle by an acquisition section of the portable wireless terminal. When accepting the operation of the function setting by the rider, the input section of the portable wireless terminal changes a guidance for the operation provided to the rider on the basis of the information on the function setting acquired by the acquisition section of the portable wireless terminal.

In the assistance system, the portable wireless terminal, the control method for the assistance system, the control method for the portable wireless terminal, and the program according to the present invention, the acquisition section of the portable wireless terminal wirelessly acquires the information on the function setting operated on the input device of the straddle-type vehicle, and the input section of the portable wireless terminal provides the guidance corresponding to the information on the function setting operated on the input device of the straddle-type vehicle when accepting the operation of the function setting by the rider. Accordingly, when the rider uses the portable wireless terminal to make the function setting of the straddle-type vehicle, the rider can receive the guidance that is based on the function setting that the rider has made on the input device while using the straddle-type vehicle. As a result, necessity of the rider to memorize the function setting is reduced, and assistance for the rider is promoted.

BRIEF DESCRIPTION OF THE DRAWINGS

FIG. 1 is a view illustrating a schematic configuration of an assistance system according to an embodiment of the present invention.

FIG. 2 is a chart of an example of a processing flow in a portable wireless terminal by the assistance system according to the embodiment of the present invention.

DETAILED DESCRIPTION

A description will hereinafter be made on an assistance system, a portable wireless terminal, a control method for the assistance system, a control method for the portable wireless terminal, and a program according to the present invention with reference to the drawings.

Each of a configuration, operation, and the like, which will be described below, is merely one example, and the assistance system, the portable wireless terminal, the control method for the assistance system, the control method for the portable wireless terminal, and the program according to the present invention are not limited to a case with such a configuration, such operation, and the like.

For example, a description will hereinafter be made on a case where the assistance system according to the present invention is used for a two-wheeled motor vehicle. However, the assistance system according to the present invention may be used for a straddle-type vehicle other than the two-wheeled motor vehicle. The straddle-type vehicle means a vehicle in general that a rider straddles. The straddle-type vehicles include motorcycles (the two-wheeled motor vehicle and a three-wheeled motor vehicle), an all-terrain vehicle, a pedal-driven vehicle, and the like. The motorcycles include: the two-wheeled motor vehicle or the three-wheeled motor vehicle that has an engine as a propelling source; the two-wheeled motor vehicle or the three-wheeled motor vehicle that has a motor as the propelling source; and the like, and examples of the motorcycles are a bike, a scooter, and an electric scooter. The pedal-driven vehicle means a vehicle in general that can travel forward on a road by a depression force applied to pedals by the rider. The pedal-driven vehicles include a normal pedal-driven vehicle, an electrically-assisted pedal-driven vehicle, an electric pedal-driven vehicle, and the like.

In addition, a detailed structure will appropriately be illustrated in a simplified manner or will not be illustrated.

A description will hereinafter be made on an assistance system according to an embodiment.

Configuration of Assistance System

A description will be made on a configuration of the assistance system according to the embodiment. FIG. 1 is a view illustrating a schematic configuration of the assistance system according to the embodiment of the present invention.

As illustrated in FIG. 1, an assistance system 1 at least includes an input device 11, a communication device 12, a controller 13, and a portable wireless terminal 50 that are provided to a straddle-type vehicle 10.

The input device 11 accepts an operation of function setting of the straddle-type vehicle 10 by the rider. The function settings accepted by the input device 11 include settings to enable or disable various functions such as switch cruise control, adaptive cruise control, and brake assist. The function settings accepted by the input device 11 also include adjustment of various functions such as an upper-limit speed in the cruise control, an upper-limit speed and an inter-vehicular distance in the adaptive cruise control, an irradiation angle of a headlight, and a damping degree in damping control. Furthermore, the function settings accepted by the input device 11 include settings of functions of the input device 11 itself such as a language and design. The input device 11 is preferably provided near a handlebar of the straddle-type vehicle 10. In addition, the input device 11 may be communicable with a helmet worn by the rider. When receiving information on the function setting made on an input device provided to the helmet, the input device 11 may accept the operation of the function setting of the straddle-type vehicle 10 by the rider. A term "function" in the present invention means not only a function handled as a single setting item but also a function handled as a group of plural setting items. Such a group may be predetermined by a manufacturer or may be combined freely and registered by the rider. In such a case, registration of the combination by the rider is also included in the "function setting" in the present invention.

The communication device 12 communicates with the portable wireless terminal 50. The communication device 12 may directly communicate with the portable wireless terminal 50 or may indirectly communicate with the portable wireless terminal 50 via a site such as a server. The communication device 12 can wirelessly send various types of information acquired in the straddle-type vehicle 10. In addition, the communication device 12 can wirelessly receive various types of information that are output from an output section 53, which will be described below, in the portable wireless terminal 50.

The controller 13 governs operation of the straddle-type vehicle 10. The controller 13 may be provided as one unit or may be divided into plural units, for example. The controller 13 causes the straddle-type vehicle 10 to exert the various functions on the basis of output of various sensors provided to the straddle-type vehicle 10. The controller 13 also causes the straddle-type vehicle 10 to perform the operation, to which information on the function setting entered by the rider who operates the input device 11 is reflected. The controller 13 may partially or entirely be constructed of a microcomputer, a microprocessor unit, or the like, may be constructed of a member in which firmware or the like can be updated, or may be a program module or the like that is executed by a command from a CPU or the like, for example.

The portable wireless terminal 50 is a smartphone or a tablet computer, for example. The portable wireless terminal 50 at least includes an acquisition section 51, an input section 52, and the output section 53. The portable wireless terminal 50 can wirelessly receive the various types of the information acquired in the straddle-type vehicle 10. In addition, the portable wireless terminal 50 can wirelessly send the various types of the information that are output from the output section 53. Each of the acquisition section 51, the input section 52, and the output section 53 may be constructed of a microcomputer, a microprocessor unit, or the like, may be constructed of a member in which firmware or the like can be updated, or may be a program module or the like that is executed by a command from a CPU or the like, for example.

The acquisition section 51 of the portable wireless terminal 50 wirelessly acquires the various types of the information that are output from the communication device 12 of the straddle-type vehicle 10. In particular, the acquisition section 51 wirelessly acquires the information on the function setting operated on the input device 11 of the straddle-type vehicle 10.

The input section 52 of the portable wireless terminal 50 is a user interface such as a touchscreen. The input section 52 may display the information in a portion operated by the rider or may display the information in a different portion from the portion operated by the rider.

The input section 52 accepts the operation of the function setting of the straddle-type vehicle 10 by the rider. That is, the portable wireless terminal 50 includes a program that makes the various functions of the straddle-type vehicle 10. The rider operates the input section 52 and enables the program. In this way, a guidance screen for setting of the various functions of the straddle-type vehicle 10 can be displayed on the portable wireless terminal 50. The guidance screen displays a list of the functions that can be set by the rider, a list of setting states that can be selected by the rider for each of the functions, an entry field for a numerical value set for each of the functions, a guide to each of the functions, and the like. The input section 52 may display such guidance or may use another means such as voice for such guidance. The functions that can be set by the rider using the input section 52 may be the same as the functions that can be set by the rider using the input device 11, or may differ therefrom. The functions that can be set by the rider using the input section 52 preferably cover, in addition to the functions that can be set by the rider using the input device 11, different functions from the functions that can be set by the rider using the input device 11. With such a configuration, it is possible to downsize the input device 11 (particularly, a processing section) and allow the rider to make a variety of settings at the same time.

The input section 52 changes the guidance provided to the rider on the basis of the information on the function setting operated on the input device 11 of the straddle-type vehicle 10 and acquired by the acquisition section 51.

More specifically, the input section 52 determines a default of the function setting on the basis of the information on the function setting operated on the input device 11 of the straddle-type vehicle 10 and acquired by the acquisition section 51, and provides the guidance corresponding to the default. For example, the input section 52 displays, as the guidance screen, a screen in which the state of the function setting operated on the input device 11 of the straddle-type vehicle 10 is entered as an initial value. The rider can make the function setting of the straddle-type vehicle 10 by adding a change to the state. For example, in the case where the rider operates the input device 11 of the straddle-type vehicle 10 and selects a particular language, the input section 52 displays the guidance screen in the particular language.

The input section 52 determines the function as a target of the function setting on the basis of the information on the function setting operated on the input device 11 of the straddle-type vehicle 10 and acquired by the acquisition section 51, and provides the guidance corresponding to such a function. For example, in the case where the rider operates the input device 11 of the straddle-type vehicle 10 and selects a particular function, the input section 52 displays, as the guidance screen, a setting screen of the function to be set in association with the particular function.

The input section 52 determines a limit of the function setting on the basis of the information on the function setting operated on the input device 11 of the straddle-type vehicle 10 and acquired by the acquisition section 51, and provides the guidance corresponding to such a limit. For example, in the case where the rider operates the input device 11 of the straddle-type vehicle 10 and selects the particular function, on the guidance screen, the input section 52 increases/reduces a numerical range within which entry by the rider is allowed or the function, the selection of which by the rider is allowed, according to the particular function.

The input section 52 determines a quantity of options in the function setting on the basis of the information on the function setting operated on the input device 11 of the straddle-type vehicle 10 and acquired by the acquisition section 51, and provides the guidance corresponding to such quantity. For example, in the case where the rider operates the input device 11 of the straddle-type vehicle 10 and selects the particular function, the input section 52 changes the quantity of the options to be provided for the selection by the rider by dividing the numerical range, within which the setting is allowed, according to the particular function.

The input section 52 determines the rider's driving intention on the basis of the information on the function setting operated on the input device 11 of the straddle-type vehicle 10 and acquired by the acquisition section 51, and provides the guidance corresponding to such driving intention. For example, in the case where it is possible to estimate the rider's driving intention from the plural functions that are selected by the rider who operates the input device 11 of the straddle-type vehicle 10, the input section 52 displays, as the guidance screen, a setting screen of the functions to be set in association with the rider's driving intention.

The output section 53 of the portable wireless terminal 50 wirelessly outputs the information on the function setting that is accepted by the input section 52 of the portable wireless terminal 50. The communication device 12 of the straddle-type vehicle 10 receives such information, and the controller 13 of the straddle-type vehicle 10 causes the straddle-type vehicle 10 to perform the operation, to which the information is reflected.

Here, the portable wireless terminal 50 and the communication device 12 preferably correlate with each other in advance. That is, in the case where the particular communication device 12 that is registered in advance is in a power ON state within a communication permitted area, the portable wireless terminal 50 can automatically establish communication with the communication device 12. When the communication is established, the portable wireless terminal 50 automatically starts receiving the information on the function setting operated on the input device 11 of the straddle-type vehicle 10. When the portable wireless terminal 50 completes the reception, that is, when the acquisition section 51 acquires the information on the function setting operated on the input device 11 of the straddle-type vehicle 10, the portable wireless terminal 50 may automatically start the guidance on the function setting using the input section 52. In addition, in the case where the particular portable wireless terminal 50 that is registered in advance is in a power ON state within the communication permitted area, the communication device 12 can automatically establish the communication with the portable wireless terminal 50. When the communication is established, the communication device 12 automatically starts receiving the information on the function setting that is output from the output section 53 of the portable wireless terminal 50.

Operation of Assistance System

A description will be made on operation of the assistance system according to the embodiment. FIG. 2 is a chart of an example of a processing flow in the portable wireless terminal by the assistance system according to the embodiment of the present invention.

When the rider uses the portable wireless terminal 50 to enable the program that makes the function setting of the straddle-type vehicle 10, the processing flow illustrated in FIG. 2 is repeatedly executed in the portable wireless terminal 50.

In step S101, the acquisition section 51 wirelessly acquires the information on the function setting operated on the input device 11 of the straddle-type vehicle 10. The portable wireless terminal 50 displays the guidance screen for the function setting of the straddle-type vehicle 10.

In step S102, the input section 52 determines whether the information on the function setting that is acquired in step S101 is changed from the information on the function setting that is stored in the portable wireless terminal 50. If a determination result is Yes, the processing proceeds to step S103. If the determination result is No, the processing proceeds to step S104.

In step S103, on the guidance screen, the input section 52 inquires of the rider about whether to validate the information on the function setting acquired in step S101. If the rider's entry is Yes, the processing proceeds to step S106. If the rider's entry is No, the processing proceeds to step S105.

In step S104, the input section 52 sequentially provides the guidance corresponding to the information on the function setting that is stored in the portable wireless terminal 50, and accepts the operation of the function setting of the straddle-type vehicle 10 by the rider. The output section 53 wirelessly outputs the information on the function setting that is accepted by the input section 52 to the controller 13 so as to operate the straddle-type vehicle 10 on the basis of the information on the function setting.

In step S105, the input section 52 sequentially provides the guidance corresponding to the information on the function setting acquired in step S101, and accepts the operation of the function setting of the straddle-type vehicle 10 by the rider. The output section 53 wirelessly outputs the information on the function setting that is accepted by the input section 52 to the controller 13 so as to operate the straddle-type vehicle 10 on the basis of the information on the function setting.

In step S106, the output section 53 outputs and stores the information on the function setting acquired in step S101 in storage means of the portable wireless terminal 50.

Effects of Assistance System

A description will be made on effects of the assistance system according to the embodiment.

In the assistance system 1, the acquisition section 51 of the portable wireless terminal 50 wirelessly acquires the information on the function setting operated on the input device 11 of the straddle-type vehicle 10, and the input section 52 of the portable wireless terminal 50 provides the guidance corresponding to the information on the function setting operated on the input device 11 of the straddle-type vehicle 10 when accepting the operation of the function setting by the rider. Accordingly, when the rider uses the portable wireless terminal 50 to make the function setting of the straddle-type vehicle 10, the rider can receive the guidance that is based on the function setting that the rider has made on the input device 11 while using the straddle-type vehicle 10. As a result, necessity of the rider to memorize the function setting is reduced, and assistance for the rider is promoted.

Preferably, in the assistance system 1, in the case where the portable wireless terminal 50 establishes the communication with the communication device 12, which is registered in advance, the acquisition section 51 automatically starts acquiring the information on the function setting operated on the input device 11 of the straddle-type vehicle 10. With such a configuration, even under a situation where the portable wireless terminal 50 cannot establish the communication with the communication device 12, reliability of the rider to receive the guidance, which is based on the function setting the rider has made on the input device 11 while using the straddle-type vehicle 10, is improved.

Preferably, in the assistance system 1, in the case where the communication device 12 establishes the communication with the portable wireless terminal 50, which is registered in advance, the communication device 12 automatically starts receiving the information on the function setting that is output from the output section 53 of the portable wireless terminal 50. With such a configuration, even under a situation where the communication device 12 cannot establish the communication with the portable wireless terminal 50, reliability of reflecting the function setting, which is made by the rider who uses the portable wireless terminal 50, to the operation of the straddle-type vehicle 10 is improved.

Preferably, in the assistance system 1, in the case where the acquisition section 51 of the portable wireless terminal 50 acquires the information on the function setting, the input section 52 of the portable wireless terminal 50 automatically starts the guidance. With such a configuration, an effort for the rider to call the guidance is alleviated, and the rider's perception of the function setting using the portable wireless terminal 50 is promoted.

The description has been made so far on the embodiment. However, the present invention is not limited to the description of the embodiment. That is, the present invention includes modes in each of which the embodiment that has been described so far is modified. For example, only a part of the embodiment may be implemented, or a part of the embodiment may be modified.

REFERENCE SIGNS LIST

1: Assistance system
10: Straddle-type vehicle
11: Input device
12: Communication device
13: Controller
50: Portable wireless terminal
51: Acquisition section
52: Input section
53: Output section

The invention claimed is:

1. An assistance system (1) for function setting of a straddle-type vehicle (10) by a rider, the assistance system comprising:
   an input device (11) that is provided to the straddle-type vehicle (10) and accepts an operation of the function setting of the straddle-type vehicle (10) by the rider;
   an electronic communication device (12) provided to the straddle-type vehicle (10);
   a portable wireless terminal (50) that directly or indirectly communicates with the electronic communication device (12) of the straddle-type vehicle (10) and is configured to:
      accept the operation of the function setting of the straddle-type vehicle (10) set by the rider via the portable wireless terminal (50); and
      wirelessly output information on the function setting accepted by the portable wireless terminal (50); and
   a controller (13) that is provided to the straddle-type vehicle (10) and causes the straddle-type vehicle (10) to perform operation, to which the information on the function setting output from the portable wireless terminal (50) is reflected, wherein
   the portable wireless terminal (50) further wirelessly acquires the information on the function setting operated on the input device (11) of the straddle-type vehicle (10), and
   when accepting the operation of the function setting by the rider, the portable wireless terminal (50) changes a guidance for the operation provided to the rider by the portable wireless terminal (50) based on the information on the function setting operated on the input device (11) of the straddle-type vehicle (10) and acquired by the portable wireless terminal (50),
   wherein the function setting includes setting of at least one of a cruise control, an adaptive cruise control, a brake assist, a headlight control, and a damping control during a riding operation of the straddle-type vehicle by the rider.

2. The assistance system according to claim 1, wherein in the case where the portable wireless terminal (50) establishes communication with the electronic communication device (12), which is registered in advance, the portable wireless terminal (50) automatically starts acquiring the information on the function setting operated on the input device (11) of the straddle-type vehicle (10).

3. The assistance system according to claim 1, wherein in the case where the electronic communication device (12) establishes communication with the portable wireless terminal (50), which is registered in advance, the electronic communication device (12) of the straddle-type vehicle (10) automatically starts receiving the information on the function setting that is output from the portable wireless terminal (50).

4. The assistance system according to claim 1, wherein in the case where the portable wireless terminal (50) acquires the information on the function setting operated on the input device (11) of the straddle-type vehicle (10), the portable wireless terminal (50) automatically starts the guidance.

5. The assistance system according to claim 1, wherein the portable wireless terminal (50) determines a default of the function setting operated by the rider based on the information on the function setting operated on the input device (11) of the straddle-type vehicle (10) and acquired by the portable wireless terminal (50), and provides the guidance corresponding to the default.

6. The assistance system according to claim 1, wherein the portable wireless terminal (50) determines a function as a target of the function setting operated by the rider based on the information on the function setting operated on the input device (11) of the straddle-type vehicle (10) and acquired by the portable wireless terminal (50), and provides the guidance corresponding to the function.

7. The assistance system according to claim 1, wherein the portable wireless terminal (50) determines a limit of the function setting operated by the rider based on the information on the function setting operated on the input device (11) of the straddle-type vehicle (10) and acquired by the portable wireless terminal (50), and provides the guidance corresponding to the limit.

8. The assistance system according to claim 1, wherein the portable wireless terminal (50) determines a quantity of options in the function setting operated by the rider based on the information on the function setting operated on the input device (11) of the straddle-type vehicle (10) and acquired by the portable wireless terminal (50), and provides the guidance corresponding to the quantity of the options.

9. The assistance system according to claim 1, wherein the portable wireless terminal (50) determines driving intention of the rider based on the information on the function setting operated on the input device (11) of the straddle-type vehicle (10) and acquired by the portable wireless terminal (50), and provides the guidance corresponding to the driving intention.

10. A portable wireless terminal (50) directly or indirectly communicating with an electronic communication device (12) of a straddle-type vehicle (10) that includes: an input device (11) that accepts an operation of function setting of the straddle-type vehicle (10) by a rider; and a controller (13) that controls operation of the straddle-type vehicle (10), the portable wireless terminal (50) configured to:
 accept the operation of the function setting of the straddle-type vehicle (10) by the rider via the portable wireless terminal (50); and
 wirelessly output information on the function setting accepted by the portable wireless terminal (50) so that the controller (13) causes the straddle-type vehicle (10) to be operated based on the information on the function setting,
 the portable wireless terminal (50) further configured to:
 wirelessly acquire the information on the function setting operated on the input device (11) of the straddle-type vehicle (10), wherein
 when accepting the operation of the function setting by the rider, the portable wireless terminal (50) changes a guidance for the operation provided to the rider based on the information on the function setting operated on the input device (11) of the straddle-type vehicle (10) and acquired by the portable wireless terminal,
 wherein the function setting includes setting of at least one of a cruise control, an adaptive cruise control, a brake assist, a headlight control, and a damping control and is set during a riding operation of the straddle-type vehicle by the rider.

11. A control method for an assistance system (1) for function setting of a straddle-type vehicle (10) by a rider, the control method comprising:
 accepting the rider's operation of the function setting of the straddle-type vehicle (10) by an input device (11) provided to the straddle-type vehicle (10);
 directly or indirectly communicating with an electronic communication device (12) provided to the straddle-type vehicle (10) by a portable wireless terminal (50) that includes: an input section (52) that accepts the operation of the function setting of the straddle-type vehicle (10) by the rider; and an output section (53) that wirelessly outputs information on the function setting accepted by the input section (52);
 causing the straddle-type vehicle (10) to perform operation, to which the information on the function setting output from the output section (53) of the portable wireless terminal (50) is reflected, by a controller (13) that is provided to the straddle-type vehicle (10);
 further wirelessly acquiring the information on the function setting operated on the input device (11) of the straddle-type vehicle (10) by an acquisition section (51) of the portable wireless terminal (50); and
 when accepting the operation of the function setting by the rider, changing a guidance for the operation provided to the rider by the input section (52) of the portable wireless terminal (50) based on the information on the function setting operated on the input device (11) of the straddle-type vehicle (10) and acquired by the acquisition section (51) of the portable wireless terminal (50),
 wherein the function setting includes setting of at least one of a cruise control, an adaptive cruise control, a brake assist, a headlight control, and a damping control during a riding operation of the straddle-type vehicle by the rider.

12. A control method for a portable wireless terminal (50) that directly or indirectly communicates with an electronic communication device (12) of a straddle-type vehicle (10) including: an input device (11) that accepts an operation of function setting of the straddle-type vehicle (10) by a rider; and a controller (13) that controls operation of the straddle-type vehicle (10), the control method comprising:
 accepting the rider's operation of the function setting of the straddle-type vehicle (10) via the portable wireless terminal (50);
 wirelessly outputting information on the function setting accepted by the portable wireless terminal (50) so that the controller (13) causes the straddle-type vehicle (10) to be operated based on the information on the function setting;
 further wirelessly acquiring the information on the function setting operated on the input device (11) of the straddle-type vehicle (10) by the portable wireless terminal (50); and
 when accepting the operation of the function setting by the rider, changing a guidance for the operation provided to the rider by the portable wireless terminal (50) based on the information on the function setting operated on the input device (11) of the straddle-type vehicle (10) and acquired by the portable wireless terminal (50),
 wherein the function setting includes setting of at least one of a cruise control, an adaptive cruise control, a brake assist, a headlight control, and a damping control during a riding operation of the straddle-type vehicle by the rider.

13. A non-transitory, computer readable medium containing instructions that when executed on a portable wireless terminal (50) that directly or indirectly communicates with an electronic communication device (12) of a straddle-type vehicle (10) that includes: an input device (11) that accepts an operation of function setting of the straddle-type vehicle (10) by a rider; and a controller (13) that controls operation of the straddle-type vehicle (10), cause the portable wireless terminal (50) to:
 accept the rider's operation of the function setting of the straddle-type vehicle (10) via the portable wireless terminal (50); and
 output information on the function setting accepted by the portable wireless terminal (50) so that the controller (13) causes the straddle-type vehicle (10) to be operated based on the information on the function setting, wherein
 the portable wireless terminal (50) acquires the information on the function setting operated on the input device (11) of the straddle-type vehicle (10), and
 when accepting the operation of the function setting by the rider, the portable wireless terminal (50) changes a guidance for the operation provided to the rider based on the information on the function setting operated on the input device (11) of the straddle-type vehicle (10) and acquired by the portable wireless terminal (50),
 wherein the function setting includes setting of at least one of a cruise control, an adaptive cruise control, a brake assist, a headlight control, and a damping control during a riding operation of the straddle-type vehicle by the rider.

* * * * *